United States Patent [19]

Freeman

[11] Patent Number: 4,549,580
[45] Date of Patent: Oct. 29, 1985

[54] PLUG ASSEMBLY FOR OFFSHORE PLATFORMS

[75] Inventor: Tommie A. Freeman, Duncan, Okla.

[73] Assignee: Halliburton Company, Duncan, Okla.

[21] Appl. No.: 663,271

[22] Filed: Oct. 22, 1984

[51] Int. Cl.[4] .......................... E02D 7/00; E02B 17/08
[52] U.S. Cl. ..................................... 138/89; 405/203; 405/232
[58] Field of Search ................... 138/89; 166/135, 188, 166/192; 405/192, 195, 203, 224, 227

[56] References Cited

U.S. PATENT DOCUMENTS

| | | | |
|---|---|---|---|
| 3,434,293 | 3/1969 | Brown | 405/207 |
| 3,577,737 | 5/1971 | Burleson | 138/89 X |
| 4,142,371 | 3/1979 | Mayfield et al. | 405/224 |
| 4,160,612 | 7/1979 | Britton et al. | 405/227 |
| 4,178,967 | 12/1979 | Streich | 166/188 X |
| 4,184,515 | 1/1980 | Streich et al. | 166/192 X |
| 4,215,951 | 8/1980 | Knox | 405/203 |
| 4,249,576 | 2/1981 | Streich et al. | 138/89 |
| 4,262,702 | 4/1981 | Streich | 405/195 X |
| 4,286,629 | 9/1981 | Streich et al. | 138/89 |
| 4,292,004 | 9/1981 | Knox | 405/203 |
| 4,412,559 | 11/1983 | Streich et al. | 138/89 |
| 4,421,138 | 12/1983 | Nickles | 166/192 X |
| 4,421,139 | 12/1983 | Nickles | 138/89 |
| 4,432,419 | 2/1984 | Streich | 166/135 X |

*Primary Examiner*—Stephen Marcus
*Assistant Examiner*—Mark Thronson
*Attorney, Agent, or Firm*—James R. Duzan; Thomas R. Weaver

[57] ABSTRACT

An improved reusable plug for sealing hollow cylindrical members, in particular, the jacket legs, pile sleeves, pilings, conductor pipes, or other similar members of offshore structures, the improved reusable plug comprising a packer mandrel assembly, packer member, packer setting assembly, dog locking sleeve assembly, pressure equalization plug assembly, and overshot retrieving assembly.

20 Claims, 2 Drawing Figures

PLUG ASSEMBLY FOR OFFSHORE PLATFORMS

BACKGROUND OF THE INVENTION

Typically, when constructed, an offshore platform has the jacket legs, pile sleeves, and conductor pipes sealed to prevent water leakage therein to facilitate towing operations and platform installation. With the jacket legs, pile sleeves, and conductor pipes sealed against water leakage, the offshore platform is usually placed on barges to be transported to the installation site or may be towed while floating to the desired site. At the installation site the offshore platform is positioned on the sea bottom by the controlled flooding of the jacket legs and, possibly, pile sleeves.

In some instances it is desirable to preinstall the piles which are used to anchor the offshore platform to the floor of the body of water in the jacket legs and pile sleeves before the platform is transported to the installation site. When the piles are pre-installed in the jacket legs or pile sleeves, they must also be sealed against water leakage thereinto.

Various types of prior art plugs which are usable to seal the jacket legs, pile sleeves and conductor pipes of offshore platforms are illustrated in U.S. Pat. Nos. 3,434,293; 3,577,737; 4,142,371; 4,160,612; 4,178,967; 4,184,515; 4,215,951; 4,249,576; 4,262,702; 4,286,629; 4,292,004; 4,412,559; 4,421,138; 4,421,139; and 4,432,419.

Several of the prior art plugs use linkage mechanisms to control or facilitate the release of the locking members retaining the plugs in position within either the jacket leg, pile sleeve or conductor pipe. Examples of such prior art plugs using linkage mechanisms from the above group of prior art plugs are illustrated in U.S. Pat. Nos. 3,577,737; 4,160,612; 4,178,967; 4,215,951; 4,292,004; 4,412,559; 4,421,138; 4,421,139; and 4,432,419.

Other prior art plugs use shear pin arrangements to control or facilitate the release of the plugs or locking members retaining the plugs in position within either the jacket leg, pile sleeve or conductor pipe. Examples of such prior art plugs using shear pin arrangements are illustrated in U.S. Pat. Nos. 3,434,293; 4,184,515; 4,249,576; 4,262,702; and 4,286,629.

However, when linkage mechanisms are used to control or facilitate the release of the locking members retaining the plugs in position, to accomodate the variations in the roundness of the members in which they are installed the linkages must either be adjustable or be manufactured for specific plugs to be used in specific members.

Also, when shear pin arrangements are used to control or facilitate the release of the plugs or locking members, it is desirable to have the shear pins shear when desired and at a reasonable level of loading. This is not always possible since large diameter plugs and/or plugs used to withstand large pressure differentials thereacross may require large diameter shear pins having high shear loading levels.

It is also desirable to have a plug which will withstand pressure loadings from either direction thereacross, which may be easily installed in a member in which it is to be used, and which may be removed without requiring the running of permanently installed lines to the surface of the offshore platform.

STATEMENT OF THE INVENTION

The present invention is directed to an improved reusable plug for sealing hollow cylindrical members such as the jacket legs, pile sleeves, pilings, conductor pipes, or other similar members of offshore platforms. The plug of the present invention utilizes an improved dog locking sleeve arrangement, will hold fluid pressure from either direction, may be easily installed in a hollow cylindrical member and utilizes an overshot retrieving assembly to remove the plug from the member in which it is installed thereby eliminating permanently installed lines from the plug to the surface of the offshore platform.

The plug of the present invention comprises a packer mandrel assembly, packer member, packer setting assembly, dog locking sleeve assembly, pressure equalization plug assembly and overshot retrieving assembly.

BRIEF DESCRIPTION OF THE INVENTION

DETAILED DESCRIPTION OF THE INVENTION

Figure 1A:
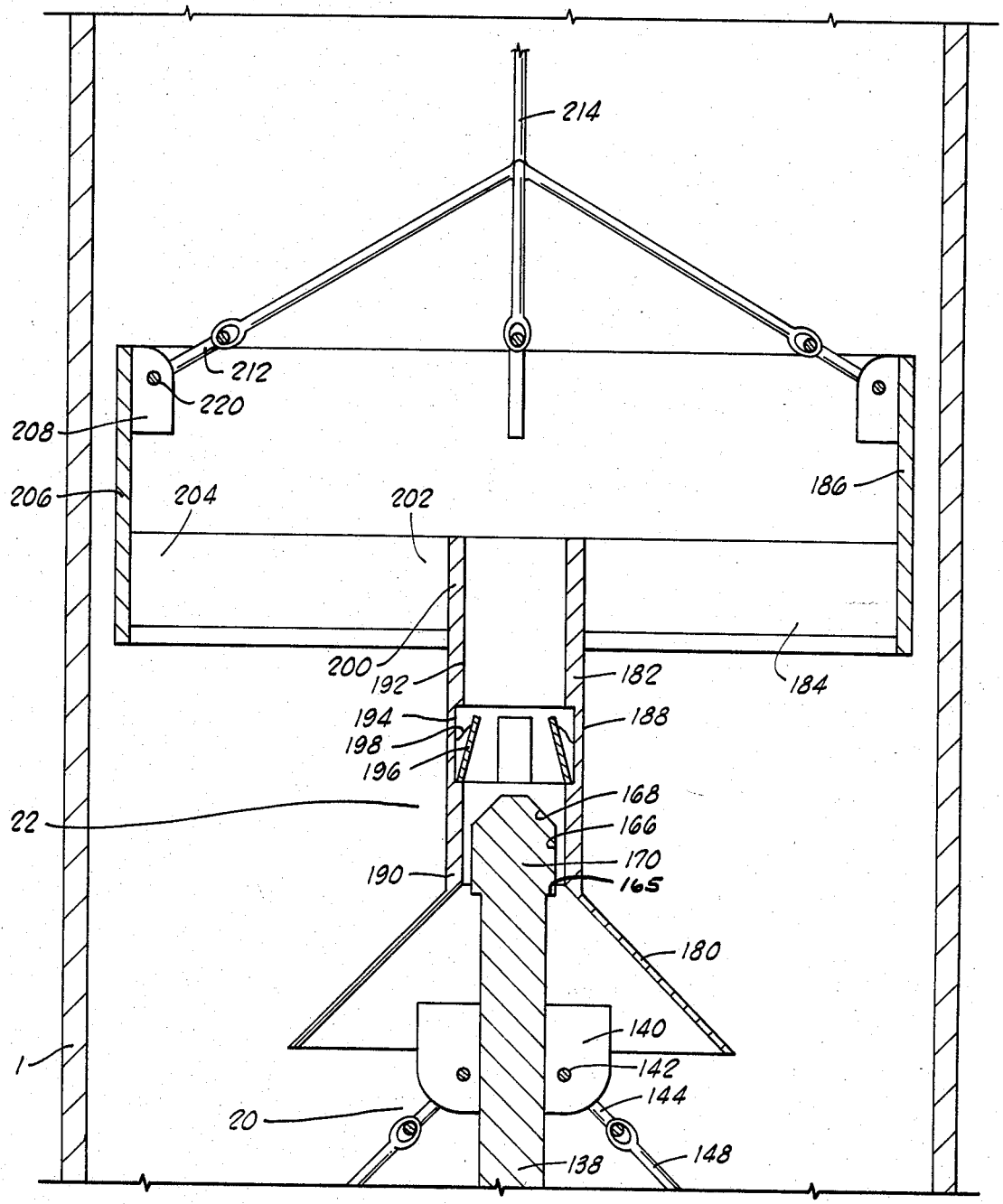
FIG. 1A is a cross-sectional view of the overshot retrieving assembly unsecured to the pressure equalization plug body of the plug of the present invention in an annular cylindrical member.
Figure 1B:
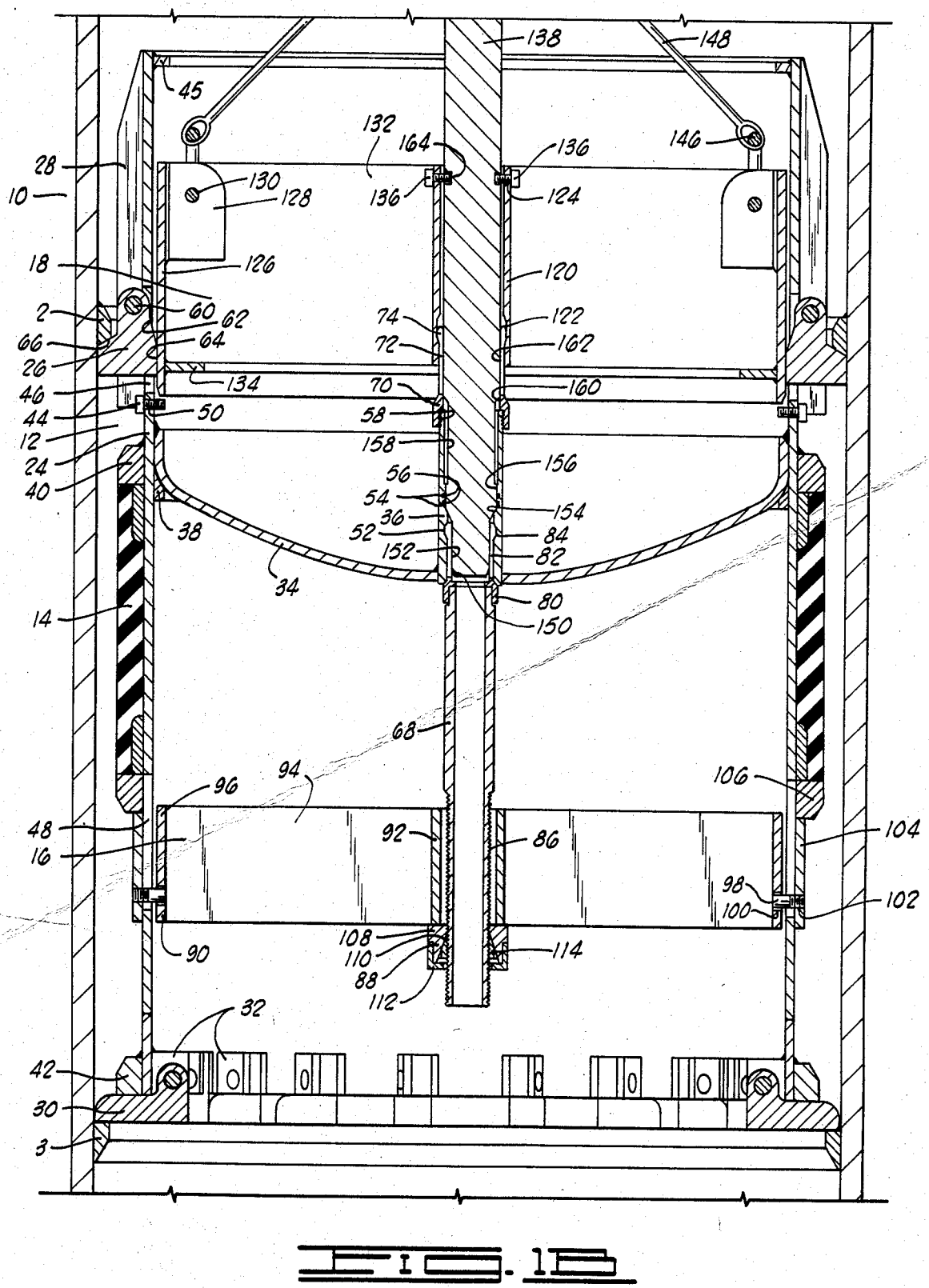
FIG. 1B is a cross-sectional view of the plug of the present invention in an annular cylindrical member with the packer member in an unset position.

Referring to FIG. 1A and 1B, the preferred embodiment of the plug assembly 10 of the present invention is shown in an annular cylindrical member 1.

The plug assembly 10 comprises a packer mandrel assembly 12, packer member 14, packer setting assembly 16, dog locking sleeve assembly 18, pressure equalization plug assembly 20 and overshot retrieving assembly 22.

The packer mandrel assembly 12 comprises packer mandrel body 24, upper locking dogs 26, upper locking dog supports 28, lower locking dogs 30, lower locking dog supports 32, dished head 34 having, in turn, collet sleeve 36 retained therein, dished head support ring 38, upper packer member retaining member 40, packer mandrel end ring 42, a plurality of lower dog locking sleeve stops 44, and upper dog locking sleeve lift retaining ring 45.

The packer mandrel body 24 comprises an annular cylindrical member having a plurality of rectangular elongated slots 46 therein through which locking dogs 26 extend and are movable into the interior thereof, having a plurality of rectangular elongated slots 48 therein through which portions of the packer setting assembly 16 extend, having a plurality of threaded apertures 50 therein which releasably, threadedly receive the plurality of dog locking sleeve stops 44 therein, having upper packer member retaining member 40 secured thereto on the exterior thereof at any suitable position by any suitable means, having dished circular head 34 and dished head support ring 38 secured thereto on the interior thereof at any suitable position by any suitable means, and having packer mandrel end ring 42 secured to one end thereof on the exterior thereof by any suitable means. The packer member retaining member 40 may be of any suitable configuration to retain one end of packer member 14 from movement when the packer member 14 is installed on the packer mandrel body 24.

The collet sleeve 36 retained in dished head 34 comprises an elongated cylindrical annular member having an annular recess 52 therein, having annular seal recesses 54 having, in turn, annular elastomeric seals 56 therein which may be of any suitable type elastomeric seal means and having threaded exterior portion 58 on one end thereof. Threadedly secured to exterior portion 58 of collet sleeve 36 is collet member 70 which comprises an annular member having a plurality of collet fingers 72 thereon, each finger 72 having, in turn, an enlarged head 74 thereon.

The dished head 34 may be of any suitable spherical or elliptical cross-sectional configuration. By utilizing a dished head 34 rather than a flat member the dished head 34 may be constructed of thinner thickness material thereby reducing the weight and cost of the plug assembly 10.

The locking dogs 26 are rotatably mounted on pins 60 which extend between adjacent locking dog supports 28 being secured thereto and rotatably extend through slots 46 in packer mandrel body 24. Each locking dog 26 is formed having an inwardly extending angular surface 62 on the interior thereof which terminates in vertical surface 64. Each locking dog 26 is further formed with angular face 66 on the exterior portion thereof which mates with upper plug body retaining ring 2.

The packer member 14 comprises any suitable compression set elastomeric packer member.

The packer setting assembly 16 comprises packer setting mandrel 68 having collet member 80 secured thereto on one end thereof, having ratchet threaded portion 86 thereon, packer setting ratchet nut 88 secured to the other end thereof, and packer setting sleeve assembly 90.

The collet member 80 comprises an annular member having a plurality of fingers 82 thereon, each finger having, in turn, an enlarged head 84 thereon.

The packer setting sleeve assembly 90 comprises packer setting sleeve mandrel 92 having a plurality of radial spokes 94 secured thereto having, in turn, packer setting sleeve rim 96 secured thereto having, in turn, a plurality of packer setting pins 98 received in apertures 100 in rim 96 which pins extend through slots 48 in packer mandrel 24 and are threadedly secured in threaded apertures 102 in packer setting ring 104 which has lower packer end ring 106 secured thereto.

The packer setting ratchet nut 88 comprises ratchet housing 108 having frusto-conical bore 110 therethrough, ratchet retainer 112 threadedly, releasably secured to ratchet housing 108 and a split ratchet nut 114 which mates with ratchet threaded portion 86 of packer setting mandrel 68.

The dog locking sleeve assembly 18 comprises cylindrical annular dog locking sleeve 120 having an annular recess 122 therein and a plurality of threaded apertures 124 therein, cylindrical annular dog locking sleeve body 126 having a plurality of lifting lugs 128 secured thereto having, in turn, apertures 130 therein, a plurality of radial supports 132 each support 132 having one end thereof secured to dog locking sleeve 120 and the other end thereof secured to dog locking sleeve body 126, annular cylindrical dog locking sleeve stiffener 134 and a plurality of shearable threaded fasteners 136 which threadedly, releasably engage threaded apertures 124 in dog locking sleeve 120.

The pressure equalization plug assembly 20 comprises pressure equalization plug body 138, a plurality of lifting lugs 140, each lug 140 having aperture 142 therein, plug lifting shackles 144, dog locking sleeve shackles 146 and a plurality of dog lifting cables 148, each cable 148 having one end thereof secured to plug lifting shackle 144 and the other end thereof secured to dog locking sleeve shackle 146.

The pressure equalization plug body 138 comprises an elongated cylindrical member having first annular chamfered surface 150, first cylindrical surface 152 which retains the enlarged heads 84 of collet member 80 into annular recess 52 of collet sleeve 36, second annular chamfered surface 154, second cylindrical surface 156, which slidingly, sealingly engages annular elastomeric seals 56 in collet sleeve 36, third cylindrical surface 158, third annular chamfered surface 160, fourth cylindrical surface 162 which retains enlarged heads 74 of collet member 70 in annular recess 122 of dog locking sleeve 120, and which has annular recess 167 therein which, in turn, receives a portion of shearable threaded fasteners 136 therein, fifth cylindrical surface 166 and frusto-conical surface 168. Since fifth cylindrical surface 166 is larger than fourth cylindrical surface 162, the combination of frusto-conical surface 166 and fifth cylindrical surface 164 form head 170 on plug body 138.

The overshot retrieving assembly 22 comprises guide 180, guide locking sleeve 182, a plurality of guide supports 184 and retrieving ring assembly 186.

The guide 180 comprises an annular frusto-conical member.

The guide locking sleeve 182 comprises an elongated annular cylindrical member having a cylindrical exterior surface 188, having one end 190 thereof secured to guide 180, having bore 192 therethrough into which head 170 of equalization plug body 138 is slidably received having, in turn, annular recess 194 therein containing a plurality of locking members 196 therein, each locking member 196 resiliently biased inwardly into bore 192 by resilient means 198, and having the other end thereof 200 secured to one end 202 of guide supports 184.

Each guide support 184 comprises an elongated rectangular member having one end 202 thereof secured to guide locking sleeve 182 and the other end 204 thereof secured to the interior of retrieving ring 206.

The retrieving ring assembly 186 comprises annular cylindrical retrieving ring 206, a plurality of retrieving ring lugs 208, each lug 208 having an aperture 220 therein, a plurality of retrieving shackles 212 and retrieving cable 214.

OPERATION OF THE INVENTION

Still referring to FIGS. 1A and 1B, to install the plug assembly 10 in a cylindrical member 1, the upper plug assembly retaining ring 2 is secured in position in the cylindrical member 1. Subsequently, the plug assembly 10 is moved into position within the cylindrical member 1 having upper locking dogs 26 engaging upper plug assembly retaining ring 2. At this time, lower plug assembly retaining ring 3 is secured in position in the cylindrical member 1 abutting or engaging lower locking dogs 30. To secure the plug assembly 10 in position in the cylindrical member 1 the dog locking sleeve assembly 18 is positioned within packer mandrel 24 having dog locking sleeve body 126 abutting vertical surface 64 of the upper locking dogs 26 and the pressure equalization plug body 138 is inserted through dog locking sleeve 120 thereby causing the enlarged heads 74 of collet sleeve 70 to be retained within annular recess 122 in sleeve 120 and is inserted into collet sleeve 36 having the fingers 82 having enlarged heads 84 thereon of collet member 80 inserted therein thereby causing the enlarged heads 84 to be retained within annular recess 52 of collet sleeve 36 and second cylindrical surface 156 of plug 138 to slidingly sealingly engage annular elastomeric seals 56 in annular recesses 54 of collet sleeve 36. To secure pressure equalization plug body 138 in position in dog locking sleeve 120 shearable threaded fasteners 136 are threaded through apertures 124 in dog locking sleeve 120 so that a portion of each fastener engages annular recess 164 in pressure equalization plug body 138. At this time, the plug assembly 10 is prevented from axial movement within cylindrical member 1 by upper 2 and lower 3 plug assembly retaining rings engaging upper locking dogs 26 and lower locking dogs 30, the upper locking dogs 26 being prevented from movement by dog locking sleeve assembly 18 while the lower locking dogs 30 are prevented from movement inwardly by lower plug assembly retaining ring 3, the dog locking sleeve assembly is prevented from movement by the enlarged head 74 of fingers 72 of collet member 70 engaging annular recess 122 of dog locking sleeve 120 being retained therein by pressure equalization plug body 138, and pressure equalization plug body 138 is prevented from movement by shearable threaded fasteners 136 engaging annular recess 164 in plug body 138 and apertures 124 in dog locking sleeve 120.

To compress the packer member 14 into engagement with the cylindrical member 1 a hydraulic jack or other device is attached to the threaded end portion 86 of packer setting mandrel 68 to apply sufficient force to the packer setting sleeve assembly 16 via packer setting ratchet nut 88 to compress the packer member 14 to seal the annulus between the plug assembly 10 and cylindrical member 1. During the packer member setting process the packer member 14 is compressed between upper packer member retaining member 40 and lower packer end ring 106. As the packer member 14 is compressed to seal the annulus between the plug assembly 10 and cylindrical member 1, the packer setting ratchet nut 88 is advanced along ratchet threaded portion 86 of packer setting mandrel 68 so that when the hydraulic jack or other device is removed, the ratchet blocks 114 are forced into engagement with ratchet threaded portion 86 of packer setting mandrel 68 by frusto-conical bore 110 of ratchet housing 108 thereby retaining packer setting sleeve mandrel 92 in position on packer setting mandrel 68. The packer setting mandrel 68 is prevented from movement by enlarged head 84 of fingers 82 of collet member 90 secured to the packer setting mandrel 68 being held in annular recess 52 of collet sleeve 36 by pressure equalization plug body 138.

Any forces applied from below the plug assembly 10 will tend to compress the packer member 14 tighter in the annulus between the plug assembly 10 and cylindrical member 1 once the packer member 14 is compressed, the axial loading of the plug assembly 10 is carried by the retaining rings 2 and 3, and fluid entering collet sleeve 36 is prevented from flowing therethrough by pressure equalization plug body 138 sealingly engaging annular elastomeric seals 56 in collet sleeve 36.

To remove the plug assembly 10 from the cylindrical member 1 overshot retrieving assembly 22 is used. The overshot retrieving assembly 22 is lowered through cylindrical member 1 until the guide 180 slides over head 170 of pressure equalization plug body 138 guiding the head 170 into bore 192 of guide locking sleeve 182 and past locking members 196 therein which are then resiliently biased into engagement with fourth cylindrical surface 162 of body 138. When an upward force is placed upon overshot assembly 22, the locking members 196 engage the annular surface 165 formed between fourth cylindrical surface 162 and fifth cylindrical surface 166 of pressure equalization plug body 138 thereby causing a force to be placed upon body 138. When the force on pressure equalization plug body 138 is sufficient, shearable threaded fasteners 136 are sheared or severed thereby causing the body 138 to be removed from dog locking sleeve 120 and collet sleeve 36. It should be noted that dog lifting cables 148 are sufficient to allow the movement of the lower end of pressure equalization plug body 138 past the enlarged heads 74 on fingers 72 of collet member 70 to allow release of the collet member 70 from dog locking sleeve 120 before any movement of the dog locking sleeve assembly 18 in the packer mandrel assembly 12.

When the pressure equalization plug body 138 moves upwardly, the collet member 80 is released initially from collet sleeve 36 thereby allowing the packer member 14 to disengage sealing engagement with cylindrical member 1 allowing fluid to flow thereby. Continued upward movement of the pressure equalization plug body 138 allows fluid to flow through collet sleeve 36 when second cylindrical surface 156 no longer engages annular elastomeric seals 56 in collet sleeve 36, allows collet member 70 to disengage annular recess 122 in dog locking sleeve 120 and cause dog locking sleeve body 126 of dog locking sleeve assembly 18 to disengage locking dogs 26. When the dog locking sleeve body 126 abuts or engages upper dog locking sleeve lift retaining ring 45, since upper locking dogs 26 are free to rotate inwardly through slots 46 in packer mandrel 24 and lower locking dogs 30 may rotate inwardly when the plug assembly 10 is moved upwardly in cylindrical member 1, the continued movement of the pressure equalization body plug 138 by overshot retrieving assembly 22 upwardly in cylindrical member 1 will cause the upper locking dogs 26 to disengage upper plug assembly retaining ring 2 and lower locking dogs 30 to disengage lower plug assembly retaining ring 3 and move past upper plug assembly retaining ring 2 thereby allowing the removal of plug assembly 10 from cylindrical member 1.

From the foregoing it can be easily seen that the plug assembly 10 of the present invention uses an improved dog locking sleeve arrangement using a collet sleeve 36 and collet member 70 to retain the same in the plug assembly 10, will hold pressure from either direction since upper 26 and lower 30 locking dogs are used and may be easily installed in a cylindrical member 1.

Having thus described my invention, I claim:

1. A removable plug assembly for temporarily sealing the interior of an annular member to prevent the flow of fluid therethrough, said annular member having an upper plug assembly retaining ring and lower plug assembly retaining ring installed therein, said removable plug assembly comprising:

a packer mandrel assembly including:
a packer mandrel body having a first and second plurality of apertures therein;
a dished head secured to the interior of the packer mandrel body having a collet sleeve retained therein, the collet sleeve having an annular recess therein and a collet member secured to one end thereof;

a plurality of upper locking dogs pivotally mounted on the packer mandrel body for retaining said removable plug assembly from axial movement in one direction when said removable plug assembly is installed in said annular member having the plurality of upper locking dogs engaging said upper plug assembly retaining ring; and a plurality of lower locking dogs pivotally mounted on the packer mandrel body for retaining said removable plug assembly from axial movement in another direction when said removable plug assembly is installed in said annular member having the plurality of lower locking dogs engaging said lower plug assembly retaining ring;

a packer member located on the packer mandrel body of the packer mandrel assembly engaging a portion thereof for sealingly engaging the interior of said annular member;

packer setting assembly including:
  a packer setting mandrel having a collet member secured to one end thereof, a portion of the collet member adapted to engage the annular recess in the collet sleeve retained in the dished head of the packer mandrel assembly, and having a ratchet threaded portion on the exterior thereof;
  a packer setting sleeve assembly slidably disposed about the other end of the packer setting mandrel; and
  a packer setting ratchet nut adapted to engage the ratchet threaded portion of the exterior of the packer setting mandrel and to abuttingly engage a portion of the packer setting sleeve assembly;

a dog locking sleeve assembly slidable within the packer mandrel body of the packer mandrel assembly adapted to engage the plurality of upper locking dogs when said removable plug assembly is installed in said annular member, the dog locking sleeve assembly including:
  a cylindrical annular dog locking sleeve having an annular recess therein adapted to releasably receive a portion of the collet member secured to the collet sleeve retained within the dished head of the packer mandrel body of the packer mandrel assembly and a plurality of apertures therein;
  a dog locking sleeve body adapted to engage the plurality of upper locking dogs of the packer mandrel assembly;
  a plurality of radial supports, each support having one end thereof secured to the cylindrical annular dog locking sleeve and the other end thereof secured to the dog locking sleeve body;
  a plurality of lifting lugs secured to the dog locking sleeve body, each lifting lug having an aperture therein;
  a plurality of shearable threaded fasteners adapted to be received by and extend through the plurality of apertures in the cylindrical annular dog locking sleeve; and a pressure equalization plug assembly releasably secured within said removable plug assembly for controlling the release of the collet member secured to one end of the packer setting mandrel of the packer setting assembly from the collet sleeve retained within the dished head secured to the interior of the packer mandrel body of the packer mandrel assembly and the release of the collet member secured to one end of the collet sleeve retained within the dished head secured to the interior of the packer mandrel body of the packer mandrel assembly from the cylindrical annular dog locking sleeve of the dog locking sleeve assembly and for allowing the flow of fluid through and around said removable plug assembly when said removable plug assembly is installed in said annular member.

2. The removable plug assembly of claim 1 wherein said removable plug assembly further comprises:
  an overshot retrieving assembly adapted to engage a portion of the pressure equalization plug assembly to retrieve said removable plug assembly from said annular member.

3. The removable plug assembly of claim 1 wherein the packer mandrel assembly further includes:
  a plurality of upper locking dog supports;
  a plurality of lower locking dog supports;
  a dished head support ring;
  an upper packer member retaining member secured to the packer mandrel body for retaining the packer member on the packer mandrel body;
  a packer mandrel end ring secured to one end of the packer mandrel body adapted to have a portion thereof abuttingly engage a portion of the plurality of lower locking dogs;
  a plurality of lower dog locking sleeve stops to limit movement downwardly in the packer mandrel body of the dog locking sleeve assembly; and
  an upper dog locking sleeve lift retaining ring to limit movement upwardly of the dog locking sleeve assembly in the packer mandrel body of the dog locking sleeve assembly.

4. The removable plug assembly of claim 1 wherein the packer setting sleeve assembly of the packer setting assembly includes:
  a packer setting sleeve mandrel;
  a packer setting sleeve rim;
  a plurality of radial spokes, each spoke having one end thereof secured to the packer setting sleeve mandrel and the other end thereof secured to the packer setting sleeve rim;
  a plurality of packer setting pins, each pin having one end thereof engaging the packer setting sleeve rim and extending through an aperture of the second plurality of apertures in the packer mandrel body;
  a packer setting ring disposed about the packer mandrel body engaging the plurality of packer setting pins; and
  a lower packer end ring disposed about the packer mandrel body engaging the packer setting ring and adapted to engage the packer member.

5. The removable plug assembly of claim 1 wherein the dog locking sleeve assembly further includes:
  an annular cylindrical dog locking sleeve stiffener secured to the interior of the dog locking sleeve body.

6. The removable plug assembly of claim 1 wherein the pressure equalization plug assembly includes:
  a pressure equalization plug body adapted to engage and releasably secure the collet member secured to one end of the collet sleeve retained within the dished head secured to the interior of the packer mandrel body of the packer mandrel assembly to the cylindrical annular dog locking sleeve of the dog locking sleeve assembly and to engage and releasably secure the collet member secured to one end of the packer setting mandrel of the packer setting assembly to the collet sleeve retained within the dished head secured to the interior of the packer mandrel body of the packer mandrel assembly and adapted to sealably engage the interior of the collet sleeve retained within the dished head secured to the interior of the packer mandrel body of the packer mandrel assembly;

a plurality of lifting lugs secured to the pressure equalization plug body, each lug having an aperture therein;

a plurality of lifting shackles engaging the plurality of lifting lugs;

a plurality of dog locking sleeve shackles engaging the dog locking sleeve assembly; and a plurality of lifting cables, each cable having one end thereof secured to a lifting shackle of the plurality of lifting shackles and the other end thereof secured to a dog locking sleeve shackle of the plurality of dog locking sleeve shackles.

7. The removable plug assembly of claim 6 wherein the pressure equalization plug body of the pressure equalization plug assembly further comprises:

an enlongated cylindrical member having a first cylindrical surface which retains a portion of the collet member secured to one end of the packer setting mandrel of the packer setting assembly to the collet sleeve retained within the dished head secured to the interior of the packer mandrel body of the packer mandrel assembly, a second cylindrical surface which slidingly sealingly engages the interior of the collet sleeve retained within the dished head secured to the interior of the packer mandrel body of the packer mandrel assembly, a third cylindrical surface, a fourth cylindrical surface which retains a portion of the collet member secured to one end of the collet sleeve retained within the dished head secured to the interior of the packer mandrel body of the packer mandrel assembly to the cylindrical annular dog locking sleeve of the dog locking sleeve assembly and which has an annular recess therein adapted to receive a portion of each shearable threaded fastener of the plurality of shearable threaded fasteners, a fifth cylindrical surface and a frusto-conical surface whereby the frusto-conical surface, the fifth cylindrical surface and the fourth cylindrical surface forming a head on the end of the pressure equalization plug body.

8. The removable plug assembly of claim 1 wherein the collet member secured to one end of the collet sleeve retained within the dished secured to the interior of the packer mandrel body of the packer mandrel assembly comprises:

an annular member having a plurality of fingers thereon, each finger having an enlarged head thereon.

9. The removable plug assembly of claim 1 wherein the collet member secured to one end of the packer setting mandrel of the packer setting assembly comprises:

an annular member having a plurality of fingers thereon, each finger having an enlarged head thereon.

10. The removable plug assembly of claim 2 wherein the overshot retrieving assembly includes:

a guide locking sleeve having a bore therethrough having, in turn, an annular recess therein containing a plurality of locking members therein, each locking member being resiliently biased inwardly into the bore through the guide locking sleeve by resilient means;

a guide secured to one end of the guide locking sleeve;

a retrieving ring assembly including:
an annular cylindrical retrieving ring;
a plurality of retrieving ring lugs, each lug having an aperture therein;
a plurality of retrieving shackles, each shackle engaging a retrieving lug of the plurality of retrieving lugs; and
a retrieving cable secured to the plurality of retrieving shackles; and a plurality of guide supports, each guide support having one end secured to the guide locking sleeve and the other end thereof secured to the annular cylindrical retrieving ring of the retrieving ring assembly.

11. The removable plug assembly of claim 3 wherein the packer setting sleeve assembly includes:
a packer setting sleeve mandrel;
a packer setting sleeve rim;
a plurality of radial spokes, each spoke having one end thereof secured to the packer setting sleeve mandrel and the other end thereof secured to the packer setting sleeve rim;
a plurality of packer setting pins, each pin having one end thereof engaging the packer setting sleeve rim and extending through an aperture of the second plurality of apertures in the packer mandrel body;
a packer setting ring disposed about the packer mandrel body engaging the plurality of packer setting pins; and
a lower packer end ring disposed about the packer mandrel body engaging the packer setting ring and adapted to engage the packer member.

12. The removable plug assembly of claim 11 wherein the dog locking sleeve assembly further includes:
an annular cylindrical dog locking sleeve stiffener secured to the interior of the dog locking sleeve body.

13. The removable plug assembly of claim 12 wherein the pressure equalization plug assembly includes:
a pressure equalization plug body adapted to engage and releasably secure the collet member secured to one end of the collet sleeve retained within the dished head secured to the interior of the packer mandrel body of the packer mandrel assembly to the cylindrical annular dog locking sleeve of the dog locking sleeve assembly and to engage and releasably secure the collet member secured to one end of the packer setting mandrel of the packer setting assembly to the collet sleeve retained within the dished head secured to the interior of the packer mandrel body of the packer mandrel assembly and adapted to sealably engage the interior of the collet sleeve retained within the dished head secured to the interior of the packer mandrel body of the packer mandrel assembly;

a plurality of lifting lugs secured to the pressure equalization plug body, each lug having an aperture therein;

a plurality of lifting shackles engaging the plurality of lifting lugs;

a plurality of dog locking sleeve shackles engaging the dog locking sleeve assembly; and a plurality of lifting cables, each cable having one end thereof secured to a lifting shackle of the plurality of lifting shackles and the other end thereof secured to a dog locking sleeve shackle of the plurality of dog locking sleeve shackles.

14. The removable plug assembly of claim 6 wherein the pressure equalization plug body of the pressure equalization plug assembly further comprises:

an enlongated cylindrical member having a first cylindrical surface which retains a portion of the collet member secured to one end of the packer setting mandrel of the packer setting assembly to the collet sleeve retained within the dished head secured to the interior of the packer mandrel body of the packer mandrel assembly, a second cylindrical surface which slidingly sealingly engages the interior of the collet sleeve retained within the dished head secured to the interior of the packer mandrel body of the packer mandrel assembly, a third cylindrical surface, a fourth cylindrical surface which retains a portion of the collet member secured to one end of the collet sleeve retained within the dished head secured to the interior of the packer mandrel body of the packer mandrel assembly to the cylindrical annular dog locking sleeve of the dog locking sleeve assembly and which has an annular recess therein adapted to receive a portion of each shearable threaded fastener of the plurality of shearable threaded fasteners, a fifth cylindrical surface and a frusto-conical surface whereby the frusto-conical surface, the fifth cylindrical surface and the fourth cylindrical surface forming a head on the end of the pressure equalization plug body.

15. A removable plug assembly for temporarily sealing the interior of an annular member to prevent the flow of fluid therethrough, said annular member having an upper plug assembly retaining ring and lower plug assembly retaining ring installed therein, said removable plug assembly comprising:

a packer mandrel assembly including:

a packer mandrel body having a first and second plurality of apertures therein;

a dished head secured to the interior of the packer mandrel body having a collet sleeve retained therein, the collet sleeve having an annular recess therein and a collet member secured to one end thereof;

a plurality of upper locking dogs pivotally mounted on the packer mandrel body for retaining said removable plug assembly from axial movement in one direction when said removable plug assembly is installed in said annular member having the plurality of upper locking dogs engaging said upper plug assembly retaining ring; and a plurality of lower locking dogs pivotally mounted on the packer mandrel body for retaining said removable plug assembly from axial movement in another direction when said removable plug assembly is installed in said annular member having the plurality of lower locking dogs engaging said lower plug assembly retaining ring;

a packer member located on the packer mandrel body of the packer mandrel assembly engaging a portion thereof for sealingly engaging the interior of said annular member;

packer setting assembly including:

a packer setting mandrel having a collet member secured to one end thereof, a portion of the collet member adapted to engage the annular recess in the collet sleeve retained in the dished head of the packer mandrel assembly, and having a ratchet threaded portion on the exterior thereof;

a packer setting sleeve assembly slidably disposed about the other end of the packer setting mandrel; and a packer setting ratchet nut adapted to engage the ratchet threaded portion of the exterior of the packer setting mandrel and to abuttingly engage a portion of the packer setting sleeve assembly;

dog locking sleeve assembly slidable within the packer mandrel body of the packer mandrel assembly adapted to engage the plurality of upper locking dogs when said removable plug assembly is installed in said annular member, the dog locking sleeve assembly including:

a cylindrical annular dog locking sleeve having an annular recess therein adapted to releasably receive a portion of the collet member secured to the collet sleeve retained within the dished head of the packer mandrel body of the packer mandrel assembly and a plurality of apertures therein;

a dog locking sleeve body adapted to engage the plurality of upper locking dogs of the packer mandrel assembly;

a plurality of radial supports, each support having one end thereof secured to the cylindrical annular dog locking sleeve and the other end thereof secured to the dog locking sleeve body;

a plurality of lifting lugs secured to the dog locking sleeve body, each lifting lug having an aperture therein;

a plurality of shearable threaded fasteners adapted to be received by and extend through the plurality of apertures in the cylindrical annular dog locking sleeve; and a pressure equalization plug assembly releasably secured within said removable plug assembly for controlling the release of the collet member secured to one end of the packer setting mandrel of the packer setting assembly from the collet sleeve retained within the dished head secured to the interior of the packer mandrel body of the packer mandrel assembly and the release of the collet member secured to one end of the collet sleeve retained within the dished head secured to the interior of the packer mandrel body of the packer mandrel assembly from the cylindrical annular dog locking sleeve of the dog locking sleeve assembly and for allowing the flow of fluid through and around said removable plug assembly when said removable plug assembly is installed in said annular member, the pressure equalization plug assembly including:

a pressure equalization plug body adapted to engage and releasably secure the collet member secured to one end of the collet sleeve retained within the dished head secured to the interior of the packer mandrel body of the packer mandrel assembly to the cylindrical annular dog locking sleeve of the dog locking sleeve assembly and to engage and releasably secure the collet member secured to one end of the packer setting mandrel of the packer setting assembly to the collet sleeve retained within the dished head secured to the interior of the packer mandrel body of the packer mandrel assembly and adapted to sealably engage the interior of the collet sleeve retained within the dished head secured to the interior of the packer mandrel body of the packer mandrel assembly and adapted to sealably engage the interior of the collet sleeve retained within the dished head secured to the interior of the packer mandrel body of the packer mandrel assembly;

a plurality of lifting lugs secured to the pressure equalization plug body, each lug having an aperture therein;

a plurality of lifting shackles engaging the plurality of lifting lugs;

a plurality of dog locking sleeve shackles engaging the dog locking sleeve assembly; and a plurality of lifting cables, each cable having one end thereof secured to a lifting shackle of the plurality of lifting shackles and the other end thereof secured to a dog locking sleeve shackle of the plurality of dog locking sleeve shackles.

16. The removable plug assembly of claim 15 wherein said removable plug assembly further comprises:

an overshot retrieving assembly adapted to releasably engage a portion of the pressure equalization plug assembly to retrieve said removable plug assembly from said annular member.

17. The removable plug assembly of claim 16 wherein the overshot retrieving assembly includes:

a guide locking sleeve having a bore therethrough having, in turn, an annular recess therein containing a plurality of locking members therein, each locking member being resiliently biased inwardly into the bore through the guide locking sleeve by resilient means;

a guide secured to one end of the guide locking sleeve;

a retrieving ring assembly including:
an annular cylindrical retrieving ring;
a plurality of retrieving ring lugs, each lug having an aperture therein;
a plurality of retrieving shackles, each shackle engaging a retrieving lug of the plurality of retrieving lugs; and
a retrieving cable secured to the plurality of retrieving shackles; and a plurality of guide supports, each guide support having one end secured to the guide locking sleeve and the other end thereof secured to the annular cylindrical retrieving ring of the retrieving ring assembly.

18. The removable plug assembly of claim 15 wherein the packer setting sleeve assembly includes:
a packer setting sleeve mandrel;
a packer setting sleeve rim;
a plurality of radial spokes, each spoke having one end thereof secured to the packer setting sleeve mandrel and the other end thereof secured to the packer setting sleeve rim;
a plurality of packer setting pins, each pin having one end thereof engaging the packer setting sleeve rim and extending through an aperture of the second plurality of apertures in the packer mandrel body;
a packer setting ring disposed about the packer mandrel body engaging the plurality of packer setting pins; and
a lower packer end ring disposed about the packer mandrel body engaging the packer setting ring and adapted to engage the packer member;

the dog locking sleeve assembly further includes:
an annular cylindrical dog locking sleeve stiffener secured to the interior of the dog locking sleeve body.

19. The removable plug assembly of claim 18 wherein the pressure equalization plug assembly includes:

a pressure equalization plug body adapted to engage and releasably secure the collet member secured to one end of the collet sleeve retained within the dished head secured to the interior of the packer mandrel body of the packer mandrel assembly to the cylindrical annular dog locking sleeve of the dog locking sleeve assembly and to engage and releasably secure the collet member secured to one end of the packer setting mandrel of the packer setting assembly to the collet sleeve retained within the dished head secured to the interior of the packer mandrel body of the packer mandrel assembly and adapted to sealably engage the interior of the collet sleeve retained within the dished head secured to the interior of the packer mandrel body of the packer mandrel assembly;

a plurality of lifting lugs secured to the pressure equalization plug body, each lug having an aperture therein;

a plurality of lifting shackles engaging the plurality of lifting lugs;

a plurality of dog locking sleeve shackles engaging the dog locking sleeve assembly; and a plurality of lifting cables, each cable having one end thereof secured to a lifting shackle of the plurality of lifting shackles and the other end thereof secured to a dog locking sleeve shackle of the plurality of dog locking sleeve shackles.

20. A removable plug assembly for temporarily sealing the interior of an annular member to prevent the flow of fluid therethrough, said annular member having an upper plug assembly retaining ring and lower plug assembly retaining ring installed therein, said removable plug assembly comprising:

a packer mandrel assembly including:
a packer mandrel body having a first and second plurality of apertures therein;
a dished head secured to the interior of the packer mandrel body having a collet sleeve retained therein, the collet sleeve having an annular recess therein and a collet member secured to one end thereof;
a plurality of upper locking dogs pivotally mounted on the packer mandrel body for retaining said removable plug assembly from axial movement in one direction when said removable plug assembly is installed in said annular member having the plurality of upper locking dogs engaging said upper plug assembly retaining ring; and
a plurality of lower locking dogs pivotally mounted on the packer mandrel body for retaining said removable plug assembly from axial movement in another direction when said removable plug assembly is installed in said annular member having the plurality of lower locking dogs engaging said lower plug assembly retaining ring;

a packer member located on the packer mandrel body of the packer mandrel assembly engaging a portion thereof for sealingly engaging the interior of said annular member;

a packer setting mandrel having a collet member secured to one end thereof, a portion of the collet member adapted to engage the annular recess in the collet sleeve retained in the dished head of the packer mandrel body of the packer mandrel assembly, and having a ratchet threaded portion on the exterior thereof;

a packer setting sleeve assembly slidingly disposed about the other end of the packer setting mandrel; and a packer setting ratchet nut adapted to engage the ratchet threaded portion of the exterior of the packer setting mandrel and to abuttingly engage a portion of the packer setting sleeve assembly;

a dog locking sleeve assembly slidable within the packer mandrel body of the packer mandrel assembly adapted to engage the plurality of upper locking dogs when said removable plug assembly is installed in said annular member, the dog locking sleeve assembly including:

a cylindrical annular dog locking sleeve having an annular recess therein adapted to releasably receive a portion of the collet member secured to the collet sleeve retained within the dished head of the packer mandrel body of the packer mandrel assembly and a plurality of apertures therein;

a dog locking sleeve body adapted to engage the plurality of upper locking dogs of the packer mandrel assembly;

a plurality of radial supports, each support having one end thereof secured to the cylindrical annular dog locking sleeve and the other end thereof secured to the dog locking sleeve body;

a plurality of lifting lugs secured to the dog locking sleeve body, each lifting lug having an aperture therein;

a plurality of shearable threaded fasteners adapted to be received by and extend through the plurality of apertures in the cylindrical annular dog locking sleeve; and a pressure equalization plug assembly releasably secured within said removable plug assembly for controlling the release of the collet member secured to one end of the packer setting mandrel of the packer setting assembly from the collet sleeve retained within the dished head secured to the interior of the packer mandrel body of the packer mandrel assembly and the release of the collet member secured to one end of the collet sleeve retained within the dished head secured to the interior of the packer mandrel body of the packer mandrel assembly from the cylindrical annular dog locking sleeve of the dog locking sleeve assembly and for allowing the flow of fluid through and around said removable plug assembly when said removable plug assembly is installed in said annular member, the pressure equalization plug assembly including:

a pressure equalization plug body adapted to engage and releasably secure the collet member secured to one end of the collet sleeve retained within the dished head secured to the interior of the packer mandrel body of the packer mandrel assembly to the cylindrical annular dog locking sleeve of the dog locking sleeve assembly and to engage and releasably secure the collet member secured to one end of the packer setting mandrel of the packer setting assembly to the collet sleeve retained within the dished head secured to the interior of the packer mandrel body of the packer mandrel assembly and adapted to sealably engage the interior of the collet sleeve retained within the dished head secured to the interior of the packer mandrel body of the packer mandrel assembly a plurality of lifting lugs secured to the pressure equalization plug body, each lug having an aperture therein;

a plurality of lifting shackles engaging the plurality of lifting lugs;

a plurality of dog locking sleeve shackles engaging the dog locking sleeve assembly; and a plurality of lifting cables, each cable having one end thereof secured to a lifting shackle of the plurality of lifting shackles and the other end thereof secured to a dog locking sleeve shackle of the plurality of dog locking sleeve shackles; and an overshot retrieving assembly adapted to releasably engage a portion of the pressure equalization plug assembly to retrieve said removable plug assembly from said annular member, the overshot retrieving assembly including:

a guide locking sleeve having a bore therethrough having, in turn, an annular recess therein containing a plurality of locking members therein, each locking member being resiliently biased inwardly into the bore through the guide locking sleeve by resilient means;

a guide secured to one end of the guide locking sleeve;

a retrieving ring assembly including:
an annular cylindrical retrieving ring;
a plurality of retrieving ring lugs, each lug having an aperture therein;
a plurality of retrieving shackles, each shackle engaging a retrieving lug of the plurality of retrieving lugs; and
a retrieving cable secured to the plurality of retrieving shackles; and a plurality of guide supports, each guide support having one end secured to the guide locking sleeve and the other end thereof secured to the annular cylindrical retrieving ring of the retrieving ring assembly.

* * * * *